(12) United States Patent
Ota

(10) Patent No.: US 9,973,494 B2
(45) Date of Patent: May 15, 2018

(54) UPLOAD MANAGEMENT SYSTEM, METHOD FOR CONTROLLING UPLOAD MANAGEMENT SYSTEM, AND STORAGE MEDIUM

(71) Applicant: CANON KABUSHIKI KAISHA, Tokyo (JP)

(72) Inventor: Shunsuke Ota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 170 days.

(21) Appl. No.: 15/164,292

(22) Filed: May 25, 2016

(65) Prior Publication Data

US 2016/0352721 A1    Dec. 1, 2016

(30) Foreign Application Priority Data

Jun. 1, 2015  (JP) ................................. 2015-111292

(51) Int. Cl.
*H04L 29/06*  (2006.01)
*H04L 29/08*  (2006.01)

(52) U.S. Cl.
CPC .......... *H04L 63/083* (2013.01); *H04L 63/108* (2013.01); *H04L 63/1408* (2013.01); *H04L 67/1097* (2013.01)

(58) Field of Classification Search
None
See application file for complete search history.

(56) References Cited

U.S. PATENT DOCUMENTS

| 7,526,810 B2 * | 4/2009 | Lalonde ................ G06F 21/563 726/24 |
| 7,639,943 B1 * | 12/2009 | Kalajan .................. G03B 29/00 396/429 |
| 8,140,647 B1 * | 3/2012 | Juillard ............... H04L 67/2842 709/203 |

(Continued)

FOREIGN PATENT DOCUMENTS

JP      2009-177783 A     8/2009

OTHER PUBLICATIONS

Patterson, How to Upload Videos to YouTube, Jul. 2011 found at https://sproutsocial.com/insights/how-to-upload-videos-youtue/.*

(Continued)

*Primary Examiner* — Peter Poltorak
(74) *Attorney, Agent, or Firm* — Canon U.S.A., Inc. IP Division

(57) ABSTRACT

An upload management system for managing data upload from a client to a storage system includes an acquisition unit, a determination unit, and a control unit. The acquisition unit acquires information about data already uploaded by the client from the storage system in response to a request from the client which performs the data upload. The determination unit determines whether the client violates a predetermined condition based on the information acquired by the acquisition unit. The control unit performs control to return authentication information for performing the data upload to the client in a case where the determination unit determines that the client does not violate the condition, and performs control not to return the authentication information in a case where the determination unit determines that the client violates the condition.

19 Claims, 10 Drawing Sheets

(56) References Cited

U.S. PATENT DOCUMENTS

| | | | | |
|---|---|---|---|---|
| 9,716,720 | B2* | 7/2017 | Adams | H04L 63/102 |
| 9,742,981 | B2* | 8/2017 | Ishida | H04N 5/23219 |
| 2002/0023156 | A1* | 2/2002 | Chujo | G06F 17/30082 |
| | | | | 709/226 |
| 2002/0138642 | A1* | 9/2002 | Miyazawa | H04L 29/06 |
| | | | | 709/232 |
| 2004/0236768 | A1* | 11/2004 | Saito | H04N 1/00132 |
| 2005/0131923 | A1* | 6/2005 | Noguchi | H04L 63/08 |
| 2005/0283835 | A1* | 12/2005 | Lalonde | G06F 21/563 |
| | | | | 726/24 |
| 2008/0141108 | A1* | 6/2008 | Matsuura | G06F 17/24 |
| | | | | 715/202 |
| 2011/0205588 | A1* | 8/2011 | Yabe | G06F 3/1213 |
| | | | | 358/1.15 |
| 2012/0110005 | A1* | 5/2012 | Kuo | H04L 67/1097 |
| | | | | 707/769 |
| 2012/0110646 | A1* | 5/2012 | Ajitomi | G06F 21/335 |
| | | | | 726/4 |
| 2013/0204849 | A1* | 8/2013 | Chacko | G06F 3/0604 |
| | | | | 707/692 |
| 2013/0232179 | A1* | 9/2013 | Chhaunker | G06F 17/3007 |
| | | | | 707/827 |
| 2013/0263207 | A1* | 10/2013 | Granstrom | G06F 21/10 |
| | | | | 726/1 |
| 2014/0052852 | A1* | 2/2014 | Dufour | H04L 43/10 |
| | | | | 709/224 |
| 2015/0095087 | A1* | 4/2015 | Adderly | G06Q 10/1095 |
| | | | | 705/7.19 |
| 2015/0180863 | A1* | 6/2015 | Kobayashi | H04L 47/70 |
| | | | | 726/9 |
| 2015/0180963 | A1* | 6/2015 | Luecke | H04L 67/06 |
| | | | | 709/203 |
| 2015/0302043 | A1* | 10/2015 | Park | G06F 17/30017 |
| | | | | 707/694 |
| 2017/0041376 | A1* | 2/2017 | Lin | H04L 67/06 |

OTHER PUBLICATIONS

Dachis, How to Upload Videos to YouTube (for Beginners), Lifehacker, May 2011.*

* cited by examiner

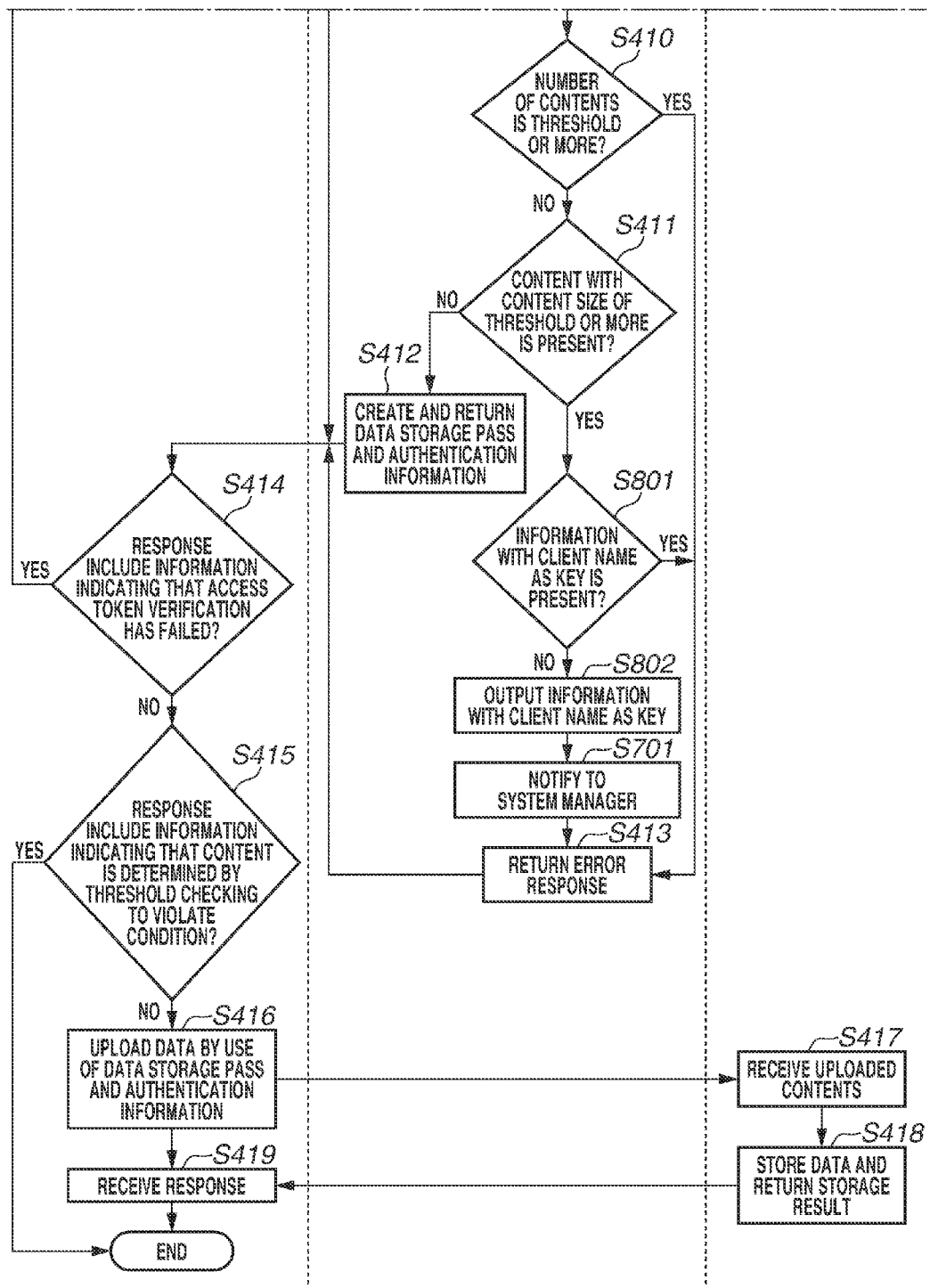

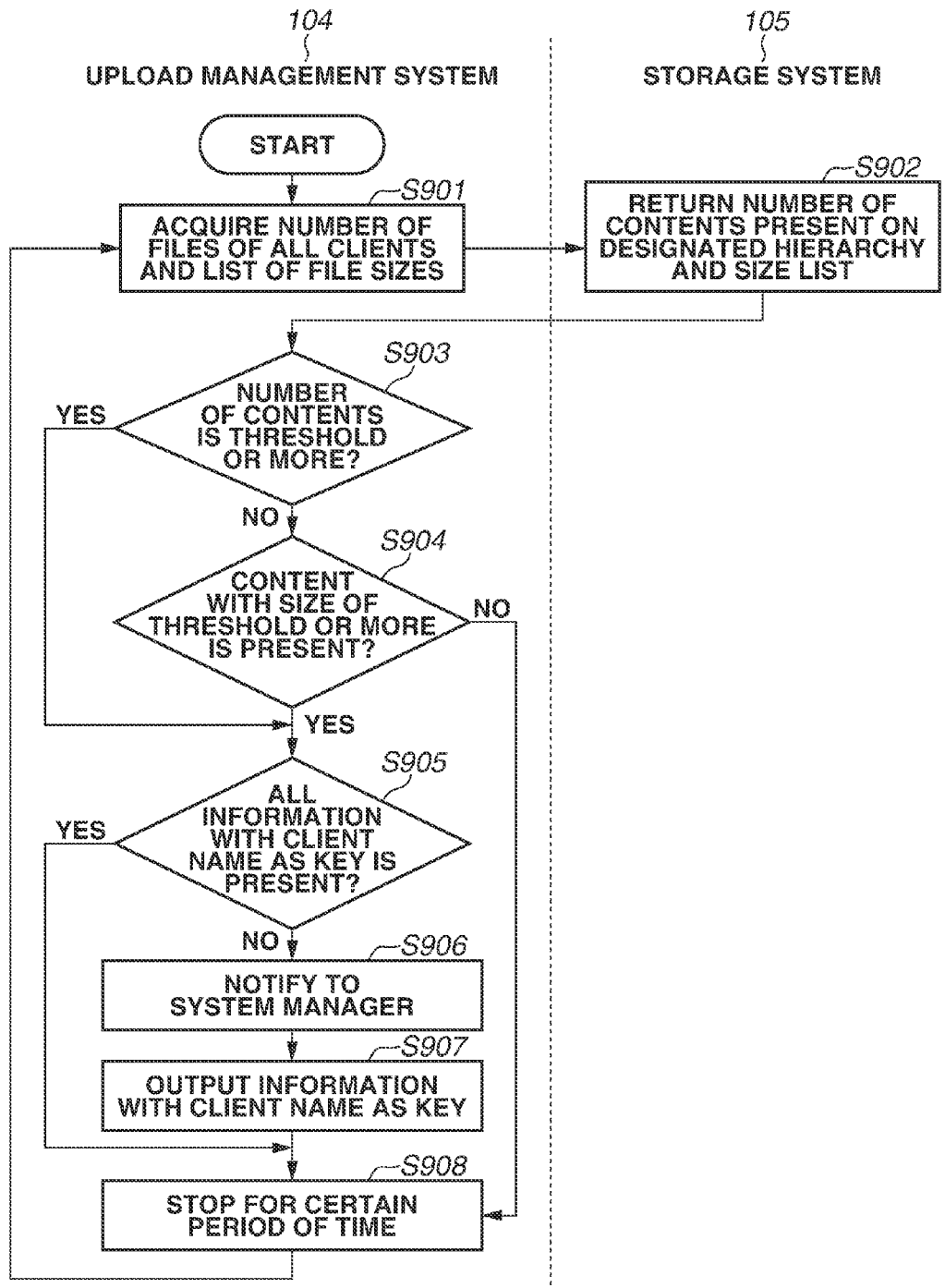

ABSTRACT# UPLOAD MANAGEMENT SYSTEM, METHOD FOR CONTROLLING UPLOAD MANAGEMENT SYSTEM, AND STORAGE MEDIUM

BACKGROUND OF THE INVENTION

Field of the Invention

The present invention relates to an upload management system for managing data upload from an authenticated client, a method for controlling the upload management system, and a storage medium.

Description of the Related Art

In recent years, cases in which data is uploaded on a network storage on the Internet from a client such as a smartphone have been increasing. In such cases, when a smartphone is lost and used by a malicious third party, a large amount of data can be uploaded on the network storage. In this case, expensive usage charge for the network storage can be billed to a user. Further, the user's storage area is full and the user cannot upload data which the user truly wants to upload. Furthermore, if the user's storage area is set to be open to other users, it can cause leakage of confidential information.

Typically, as a solution for preventing occurrence of such cases, there is considered a solution such as checking a file size of user-uploaded contents and prohibiting upload of contents with a file size equal to or greater than a threshold.

Japanese Patent Application Laid-Open No. 2009-177783 discusses a technique whereby, when the total amount of content data communicated between nodes connected to a network exceeds the predetermined amount of data, upload is suppressed. In this way, the aforementioned upload of a large amount of data by a malicious third party is prohibited.

SUMMARY OF THE INVENTION

According to an aspect of the present invention, an upload management system for managing data upload from a client to a storage system includes an acquisition unit configured to acquire information about data already uploaded by the client from the storage system in response to a request from the client which performs the data upload, a determination unit configured to determine whether the client violates a predetermined condition based on the information acquired by the acquisition unit, and a control unit configured to perform control to return authentication information for performing the data upload to the client in a case where the determination unit determines that the client does not violate the condition, and configured to perform control not to return the authentication information in a case where the determination unit determines that the client violates the condition.

Further features of the present invention will become apparent from the following description of exemplary embodiments with reference to the attached drawings.

BRIEF DESCRIPTION OF THE DRAWINGS

FIG. 9 is a flowchart illustrating a content monitoring process according to a fifth exemplary embodiment.

DESCRIPTION OF THE EMBODIMENTS

In order to perform suppress of upload by monitoring a size of content data when the data is to be uploaded, a storage system that receives a content upload request needs to perform a process such as monitoring a content size.

However, when a storage system provided by a third party or the like is used, a new process cannot be added to the storage system. In this case, the technique discussed in Japanese Patent Application Laid-Open No. 2009-177783 cannot be applied as it is, and there is a problem that upload cannot be suppressed based on a content size.

Further, there is considered a system in which a content size monitoring server is newly installed and the server receives contents uploaded by a client and checks its size and the like, and then stores the data in a storage system.

In this case, however, the content size monitoring server needs to receive a large number of requests or a large amount of data once, and thus its performance needs to be taken into consideration and is not optimum for the entire system.

The present invention is directed to a low-load upload management system capable of suppressing upload depending on a size or the number of contents without changing a storage system and without deteriorating a performance due to high load.

Exemplary embodiments of the present invention will be described below with reference to the drawings.

Figure 1:
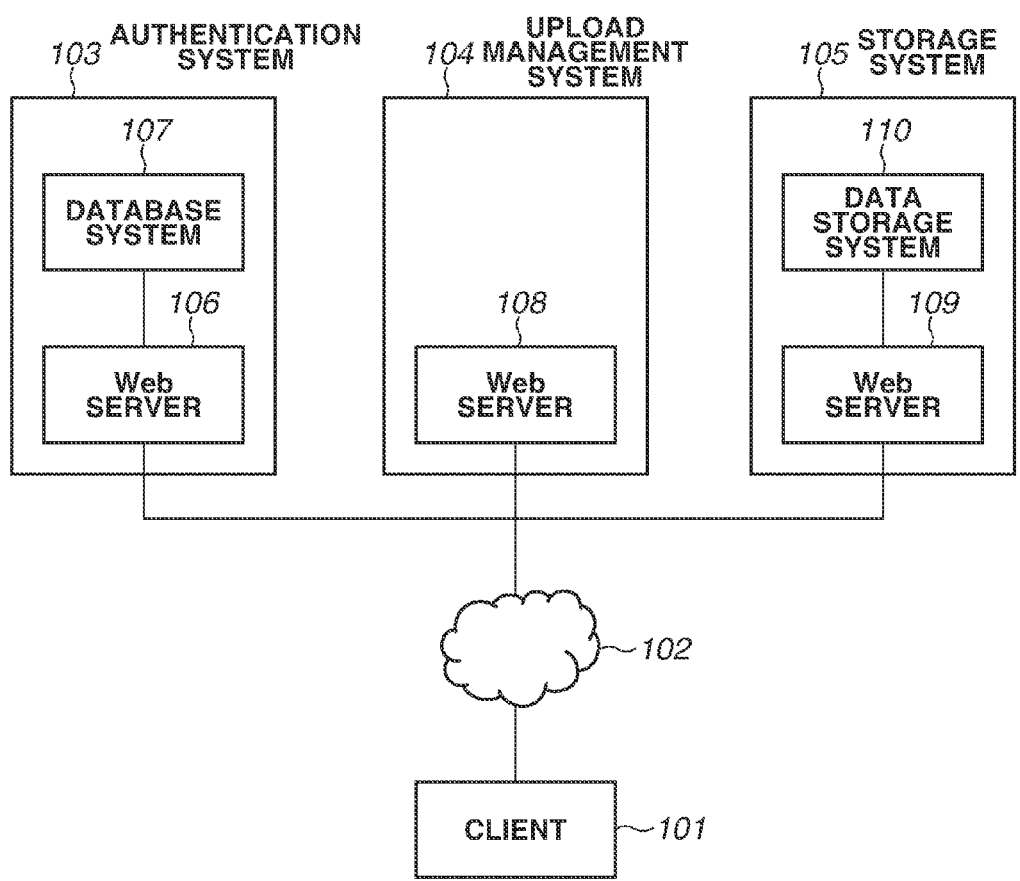
FIG. 1 is a diagram illustrating a configuration of a system according to an exemplary embodiment.

FIG. 1 is a diagram illustrating an example of a configuration of a system according to a first exemplary embodiment of the present invention.

As illustrated in FIG. 1, in the system according to the present exemplary embodiment, a client 101, an authentication system 103, an upload management system 104, and a storage system 105 are connected to each other via the Internet 102.

The client 101 may be any information processing apparatus connectable to the storage system 105 and the like, such as a personal computer (PC), a tablet terminal, a smartphone, or other device (e.g. image forming apparatus such as a copying machine or a multi function peripheral).

The authentication system 103, the upload management system 104, and the storage system 105 include the web servers 106, 108, and 109, in which web services are operating, respectively. The web services conforming to protocol such as HyperText Transfer Protocol (HTTP) or Simple Object Access Protocol (SOAP) are hosted in the respective web servers 106, 108, and 109.

A database system 107 manages data used for authentication services such as user identification (ID) and password. A data storage system 110 manages contents themselves uploaded from a client, or metadata of contents (such as content size or content pass).

In FIG. 1, the authentication system 103 and the upload management system 104 are illustrated as separate systems, but may be integrated into one system. In such a case, the web servers 106, 108 and the database system 107 may be operated on a single server.

Figure 2:
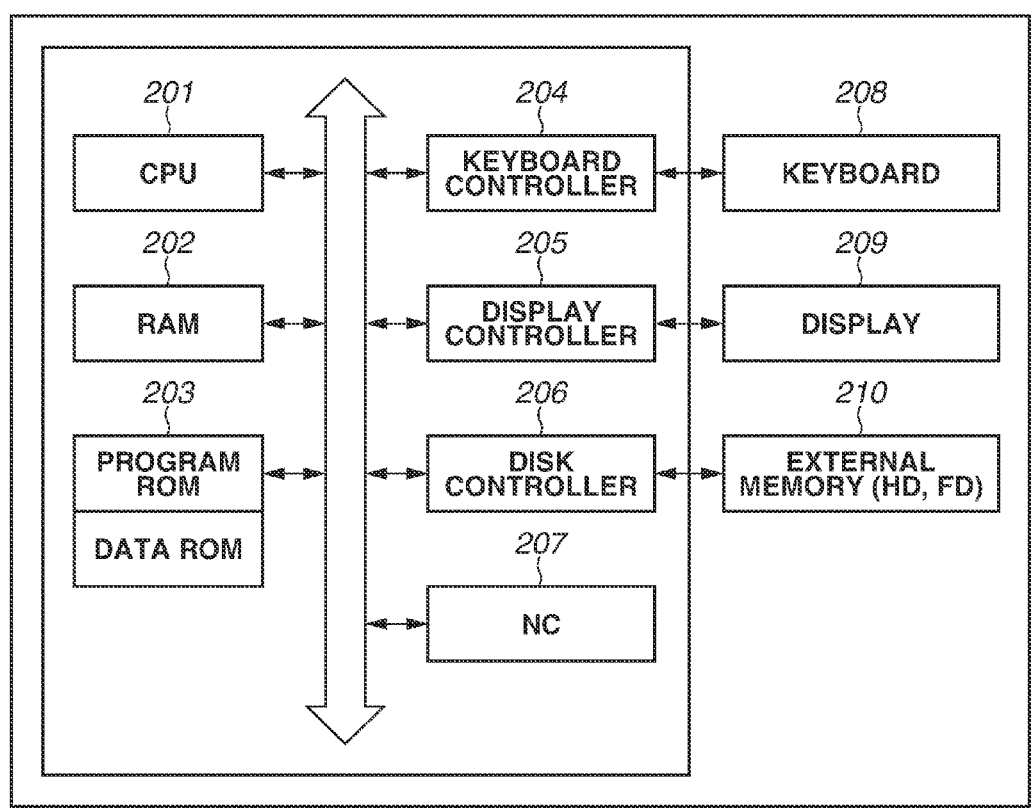
FIG. 2 is a diagram illustrating a hardware configuration of an information processing apparatus applicable to the system according to an exemplary embodiment.

FIG. 2 is a diagram illustrating an example of a hardware configuration of each of the client 101, the web servers 106, 108, and 109, the database system 107, and the data storage system 110. Each of the web servers 106, 108, and 109, the database system 107, and the data storage system 110 can be configured in hardware of a typical information processing apparatus (or PC).

In FIG. 2, a central processing unit (CPU) 201 executes programs stored in a program read only memory (ROM) in a ROM 203, or programs such as operating system (OS) or applications loaded from a hard disk 210 into a random access memory (RAM) 202. More specifically, the CPU 201 executes the programs stored in a readable storage medium and thereby functions as each process unit configured to perform the processes in each flowchart described below.

The RAM 202 is a main memory of the CPU 201 and functions as a work area. The programs executed by the CPU 201 are stored in the program ROM in the ROM 203. Various items of data are stored in a data ROM in the ROM 203.

A keyboard controller 204 controls operational inputs from a keyboard 208 or a pointing device (not illustrated) such as mouse, touchpad, touch panel, or trackball. A display controller 205 controls display on a display 209. A disk controller 206 controls data access to the external memory 210 such as hard disk (HD) that stores various items of data therein, solid state drive (SSD), or flexible disk (FD). A network controller (NC) 207 is connected to a network and performs a control process on communication with other device connected to the network. The external memory 210 stores therein programs such as an OS or applications executable by the CPU 201, or various items of data.

Figure 3:
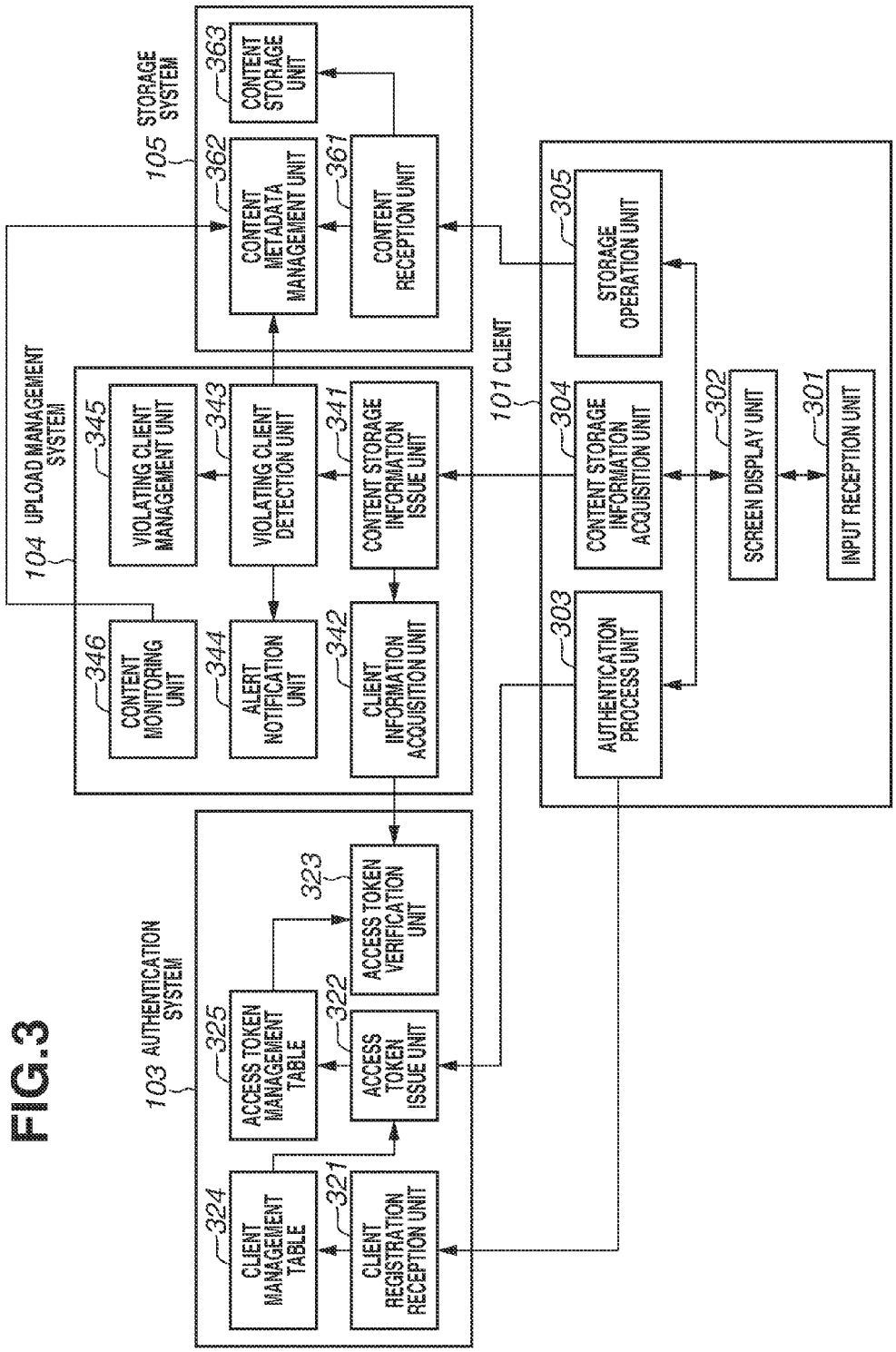
FIG. 3 is a diagram illustrating a functional block of the system according to an exemplary embodiment.

FIG. 3 is a block diagram illustrating an example of the respective functional configurations in the system according to the present exemplary embodiment.

The client 101 will be first described.

The client 101 performs a file upload process, and includes the function units such as an input reception unit 301, a screen display unit 302, an authentication process unit 303, a content storage information acquisition unit 304, and a storage operation unit 305. The CPU 201 in the client 101 loads and executes the programs stored in the external memory 210 into the RAM 202 so that the function units are realized.

The input reception unit 301 receives inputs from the user of the client 101 such as selection of contents to be uploaded or input of authentication information. The screen display unit 302 displays visual information to the user of the client 101 such as input authentication information or content selection result.

The authentication process unit 303 communicates with the authentication system 103 to acquire authentication information for accessing the upload management system 104.

The content storage information acquisition unit 304 communicates with the upload management system 104 thereby to acquire various items of information such as authentication information for accessing the storage system 105 or content upload pass (such as a Uniform Resource Locator (URL)).

The storage operation unit 305 accesses the storage system 105 by use of the content upload pass acquired by the content storage information acquisition unit 304 or the authentication information acquired by the authentication process unit 303, thereby uploading contents.

The authentication system 103 will be described below.

The authentication system 103 includes the function units such as a client registration reception unit 321, an access token issue unit 322, an access token verification unit 323, a client management table 324, and an access token management table 325. The CPU 201 in each information processing apparatus configuring the authentication system 103 loads and executes the programs stored in the external memory 210 into the RAM 202 so that the function units are realized.

The client registration reception unit 321 receives client information (such as client name) from the authentication process unit 303 in the client 101, and stores it in the client management table 324 illustrated in Table 1 described below. At this time, the client registration reception unit 321 authenticates the client 101. A plurality of authentication methods such as Basic authentication, DigeS7 authentication or authentication using client certificate are assumed, but any authentication method may be employed. Further, when successfully authenticating the client 101, the client registration reception unit 321 issues a client ID and a client password, and transmits them to the authentication process unit 303 in the client 101. The client ID and the client password are managed in association with the client information in the client management table 324 as illustrated in Table 1 described below.

The access token issue unit 322 verifies the client ID and the client password transmitted from the authentication process unit 303 in the client 101 by use of those in the client management table 324. When confirming that they are in a correct combination as a result of the verification, the access token issue unit 322 issues an access token and transmits it to the authentication process unit 303 in the client 101. The access token is authentication information when the content storage information acquisition unit 304 accesses the upload management system 104. A value of the issued access token and its expiration are stored in the access token management table 325 illustrated in Table 2 described below.

The access token verification unit 323 receives a request of verifying validity of the access token received by the upload management system 104 from the client 101. The access token verification unit 323 inquires the information stored in the access token management table 325, and verifies validity (expiration or correctness of the value) of the access token. When successfully verifying the access token, the access token verification unit 323 returns the client information associated with the access token to the upload management system 104.

TABLE 1

Client management table (324)

| Client name (A1) | Client ID (A2) | Client password (A3) |
|---|---|---|
| Client A | 1234 | pa$$word |
| Client B | 5678 | p@ssword |
| . . . | . . . | . . . |

The client management table 324 will be described below with reference to Table 1.

As illustrated in Table 1, the client management table 324 includes three items of client name (A1), client ID (A2), and client password (A3).

Client name (A1) is the name indicating a client designated by the client 101. The client name is used herein, but any other identifier with which a client can be identified may be employed. The items are used by a content storage information issue unit 341 described below.

Client ID (A2) and client password (A3) are issued by the client registration reception unit 321 for each client 101. The content storage information acquisition unit 304 in the client 101 accesses the access token issue unit 322 by use of client ID (A2) and client password (A3).

TABLE 2

Access token management table (325)

| Client ID (B1) | Access token (B2) | Expiration (B3) |
|---|---|---|
| 1234 | fasoighapoif_ia | 2015/05/05 10:20:30 |
| 5678 | 2fagh3rafasdf | 2015/05/05 10:20:35 |
| ... | ... | |

The access token management table 325 will be described below with reference to Table 2.

As illustrated in Table 2, the access token management table 325 includes three items of client ID (B1), access token (B2), and expiration (B3).

Client ID (B1) is set with a client ID issued from the client registration reception unit 321 to the client 101.

Access token (B2) is set with an access token issued by the access token issue unit 322.

Expiration (B3) is set with an expiration to which the access token is valid.

The upload management system 104 will be described below.

The upload management system 104 manages data upload from the client 101 to the storage system 105, and includes the function units such as the content storage information issue unit 341, a client information acquisition unit 342, and an violating client detection unit 343 according to the first exemplary embodiment. The CPU 201 in each information processing apparatus configuring the upload management system 104 loads and executes the programs stored in the external memory 210 into the RAM 202 so that the function units are realized. An alert notification unit 344 is an essential component in a second exemplary embodiment, an violating client management unit 345 is an essential component in a third exemplary embodiment, and a content monitoring unit 346 is an essential component in a fifth exemplary embodiment, and thus they are not essential in the first exemplary embodiment and will be described in and subsequent to the second exemplary embodiment.

The content storage information issue unit 341 receives a request from the content storage information acquisition unit 304 in the client 101. At this time, the request includes an access token issued by the access token issue unit 322. The content storage information issue unit 341 determines a storage space of contents uploaded by the client 101 by use of the request reception date and the client name included in the client information acquired by the client information acquisition unit 342 described below. Specifically, when the client name is "Client A" and the date is "May 5, 2015," the pass of the storage space of "*/Client A/20150505/*", which includes the client name and the reception date, is determined. "*" may be set with any hierarchy. Further, the content storage information issue unit 341 issues authentication information with which the client 101 accesses the storage system 105, and returns the pass of the storage space and the authentication information to the client 101.

The client information acquisition unit 342 passes the access token passed from the content storage information issue unit 341 to the access token verification unit 323 in the authentication system 103, and if the access token is confirmed as being valid, receives the returned client information.

The violating client detection unit 343 checks whether a content meeting a predetermined condition is stored in the content storage space determined by the client name of the request source and the request reception date. The conditions are "a content with a size exceeding a threshold has been already uploaded" and "contents exceeding a threshold have been already uploaded", and the thresholds are assumed to be statically determined. When the conditions are met, the violating client detection unit 343 determines that a security breach is occurring, and returns an error response to the client 101.

The storage system 105 will be finally described.

The storage system 105 includes the function units such as a content reception unit 361, a content metadata management unit 362, and a content storage unit 363. The CPU 201 in each information processing apparatus configuring the storage system 105 loads and executes the programs stored in the external memory 210 into the RAM 202 so that the function units are realized.

The content reception unit 361 has the function of receiving a request from the storage operation unit 305 in the client 101, storing contents in the content storage unit 363, and storing metadata of the contents (such as file size or hierarchy) in the content metadata management unit 362.

The content metadata management unit 362 has the function of managing metadata of contents and responding to a metadata acquisition request from the violating client detection unit 343 in the upload management system 104. The metadata includes information as illustrated in Table 3 described below. The information and storage format illustrated in Table 3 are exemplary, and other information may be stored or other format may be employed.

TABLE 3

| | | | Metadata | | | |
|---|---|---|---|---|---|---|
| No. | Hierarchy 1 (C1) | Hierarchy 2 (C2) | Hierarchy 3 (C3) | Hierarchy 4 (C4) | Content name (C5) | Size (C6) |
| 1 | * | Client A | 20150504 | * | data1.dat | 3 Mbyte |
| 2 | ... | ... | | | ... | ... |
| 3 | * | Client A | 20150504 | * | data10.dat | 1 Mbyte |
| 4 | * | Client A | 20150505 | * | data1.data | 3 Mbyte |
| 5 | * | Client B | 20150504 | * | data1.dat | 3 Mbyte |
| 6 | ... | ... | ... | ... | ... | ... |
| 7 | * | Client B | 20150504 | * | data10.dat | 1 Mbyte |
| 8 | * | Client B | 20150505 | * | data1.data | 3 Mbyte |
| 9 | ... | ... | ... | ... | ... | ... |
| 10 | * | Client B | 20150505 | * | data21.data | 3 Mbyte |
| 11 | * | Client C | 20150504 | * | data1.dat | 3 Mbyte |
| 12 | ... | ... | ... | ... | ... | ... |
| 13 | * | Client C | 20150505 | * | data10.dat | 1 Mbyte |
| 14 | * | Client C | 20150505 | * | data1.data | 100 Mbyte |

The contents stored as metadata and more specific operations of the violating client detection unit 343 will be described below with reference to Table 3.

The No column is given only for description, and is not required for actual metadata. The item No 1 indicates that a content "data1.dat" is stored in a hierarchy "*/Client A/20150504/*" and its size is 3 Mbyte.

Specific operations of the violating client detection unit 343 will be described herein.

When the content storage information issue unit 341 receives a request from the client name "Client A" on "May 5, 2015," the violating client detection unit 343 passes the information about "Client A" and "20150505" as arguments to the content metadata management unit 362. The content metadata management unit 362 returns the number of items at which hierarchy 2 (C2) is "Client A" and hierarchy (C3) is "20150505", and a size list to the violating client detection unit 343. In this case, the number of items is "1" and the size list is "3 Mbyte." The violating client detection unit 343 determines whether the numerical values exceed the thresholds. For example, assuming the threshold of the number of contents at "20" and the threshold of the content size at "5 Mbyte," it is determined, in this case, that the number of contents and the size do not exceed the thresholds.

On the other hand, when the content storage information issue unit 341 receives a request from the client name "Client B" on "May 5, 2015," the number of items returned to the violating client detection unit 343 is "21." Therefore, it exceeds the threshold "20" of the number of contents and an error response is returned to the client 101.

Further, when the content storage information issue unit 341 receives a request from the client name "Client C" on "May 5, 2015," a size list returned to the violating client detection unit 343 is "100 Mbyte." Therefore, it exceeds the content size threshold "5 Mbyte," and an error response is returned to the client 101.

The content storage unit 363 is a storage system that stores contents uploaded by the client 101. The storage system may be any system capable of storing contents, such as file system or database system.

The content upload process by the client 101 will be described below with reference to FIGS. 4, 5, and 6.

Figure 4:
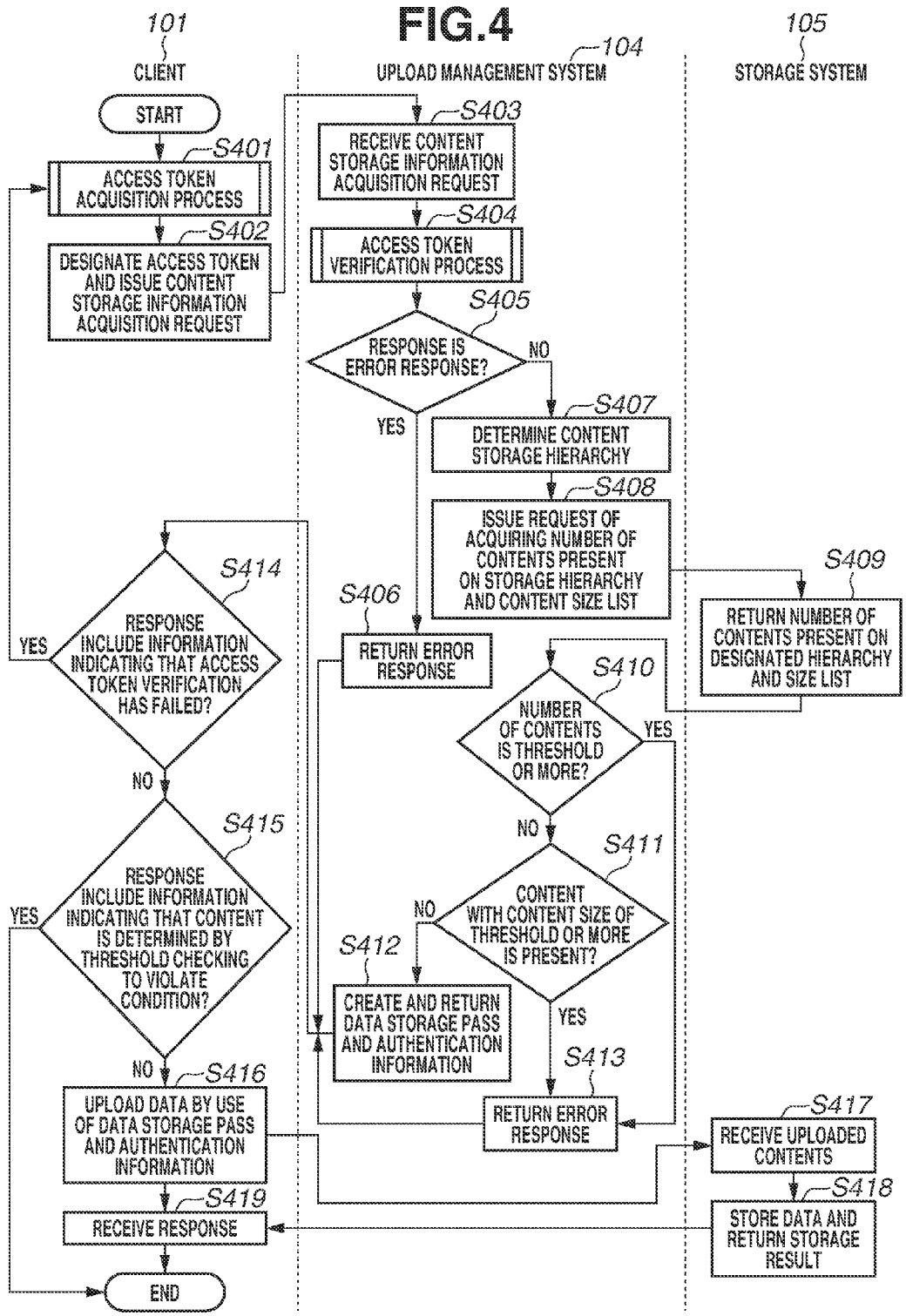
FIG. 4 is a flowchart illustrating a content upload process according to a first exemplary embodiment.

FIG. 4 is a flowchart illustrating a series of processes when a content is uploaded by the client 101 according to the first exemplary embodiment by way of example. The processes of the client 1 in FIG. 4 and FIGS. 5 to 9 described below are realized by the CPU 201 in the client 101 loading into the RAM 202 and executing the program stored in the external memory 210. Further, in the figures, the processes of the authentication system 103 are realized by the CPU 201, in each information processing apparatus that configures the authentication system 103, loading into the RAM 202 and executing the program stored in the external memory 210. Further, in the figures, the processes of the upload management system 104 are realized by the CPU 201, in each information processing apparatus that configures the upload management system 104, loading into the RAM 202 and executing the program stored in the external memory 210.

Figure 5:
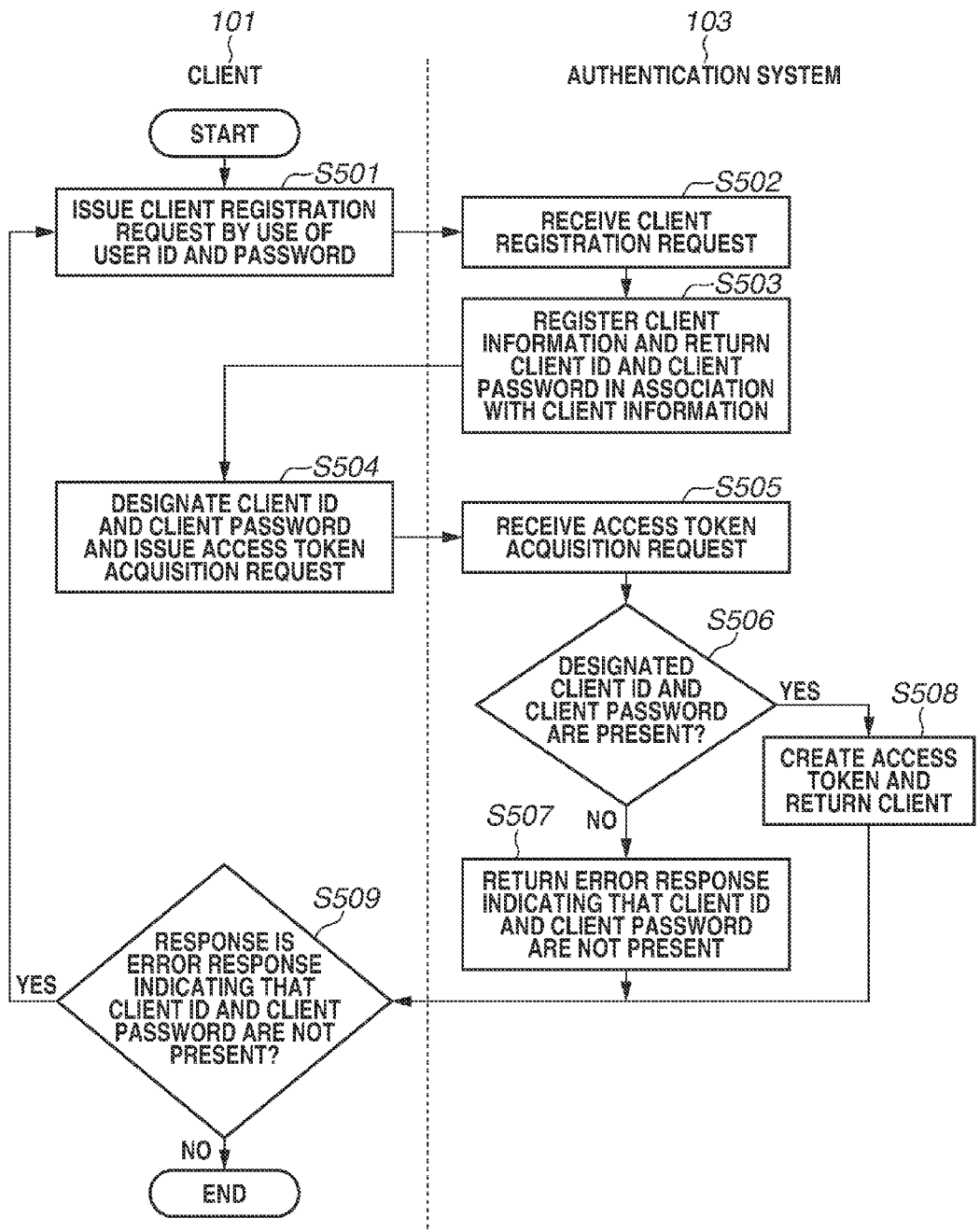
FIG. 5 is a flowchart illustrating an access token acquisition process.

In step S401, the authentication process unit 303 acquires an access token according to the flowchart illustrated in FIG. 5. The process will be separately described in detail with reference to FIG. 5. In the process, the authentication process unit 303 acquires an access token.

In step S402, the content storage information acquisition unit 304 issues a content storage information acquisition request for the content storage information issue unit 341 to the upload management system 104. At this time, the access token acquired in step S401 is designated as argument.

In step S403, the content storage information issue unit 341 in the upload management system 104 receives the content storage information acquisition request.

Figure 6:
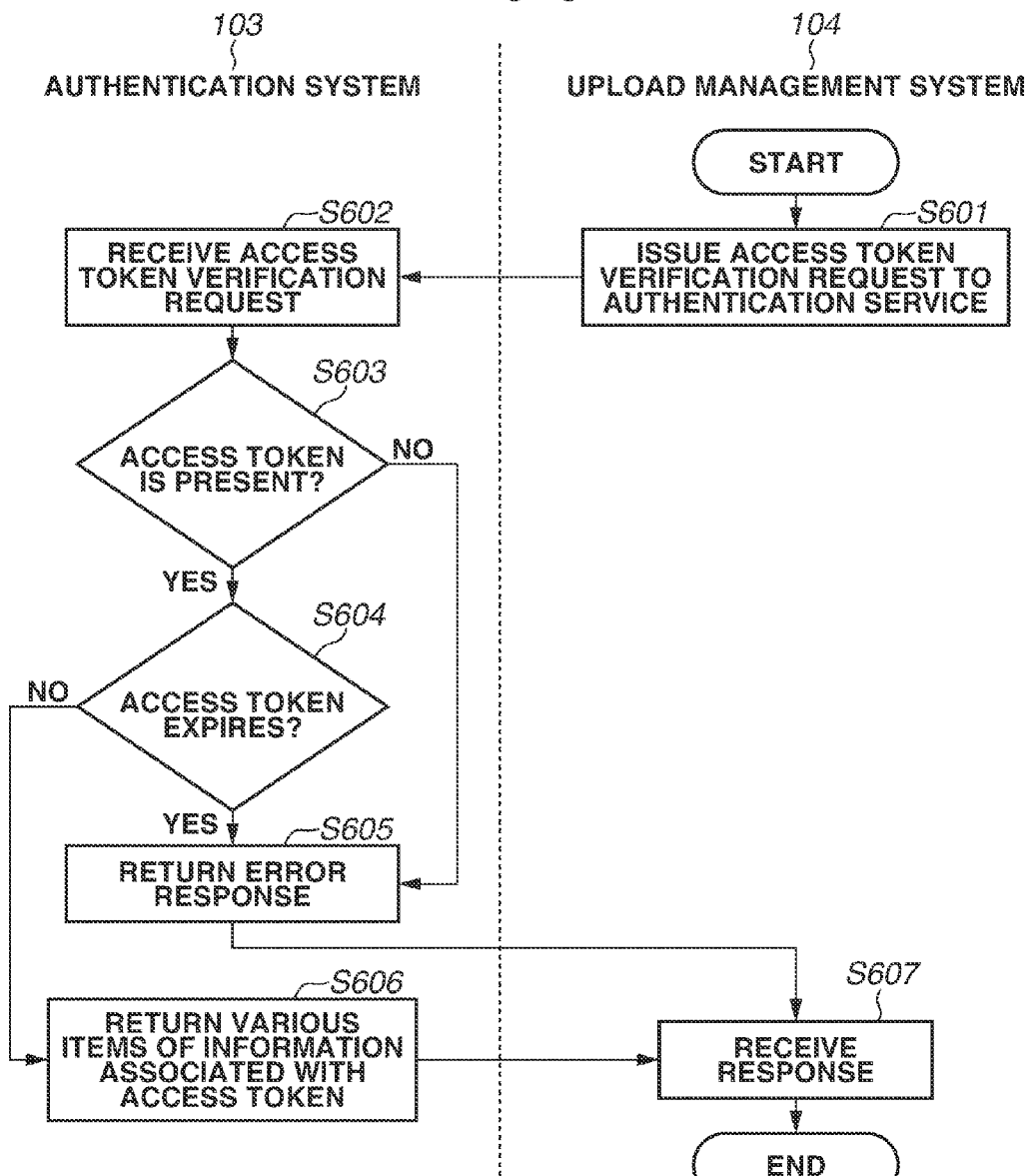
FIG. 6 is a flowchart illustrating an access token verification process.

In step S404, the client information acquisition unit 342 performs an access token verification process according to the flowchart illustrated in FIG. 6. The process will be separately described in detail with reference to FIG. 6. In the process, the client information acquisition unit 342 receives a response returned from the access token verification unit 323 in the upload management system 104.

In step S405, the client information acquisition unit 342 determines whether the response returned from the access token verification unit 323 is an error response. When the client information acquisition unit 342 determines that the response is an error response (YES in step S405), the process proceeds to step S406.

In step S406, the content storage information issue unit 341 returns an error response to the content storage information acquisition unit 304 in the client 101. At this time, the error response includes information indicating that an access token verification has failed.

On the other hand, when the client information acquisition unit 342 determines that the response is not an error response (NO in step S405), the process proceeds to step S407.

In step S407, the content storage information issue unit 341 determines a content storage hierarchy by use of the client name returned from the access token verification unit 323 and the date when the content storage information issue unit 341 receives the request. The process then proceeds to step S408.

In step S408, the violating client detection unit 343 issues a request of acquiring the number of contents present on the storage hierarchy determined in step S407 and a content size list to the storage system 105.

In step S409, the content metadata management unit 362 in the storage system 105 receives the request issued in step S408, and returns the number of contents present on the designated hierarchy and the content size list to the upload management system 104.

In step S410, the violating client detection unit 343 in the upload management system 104 determines whether the number of contents returned from the storage system 105 is a content number threshold or more. When the violating client detection unit 343 determines that the number of contents is the threshold or more (YES in step S410), the process proceeds to step S413.

On the other hand, when the violating client detection unit 343 determines that the number of contents is less than the threshold (NO in step S410), the process proceeds to step S411.

In step S411, the violating client detection unit 343 determines whether a content with a content size of the threshold or more is present in the returned content size list. When the violating client detection unit 343 determines that any content with a content size of the threshold or more is not present (NO in step S411), the process proceeds to step S412.

In step S412, the content storage information issue unit 341 creates a content storage pass. Further, the content storage information issue unit 341 creates authentication information for enabling the client 101 to access the storage system. Then, the content storage information issue unit 341 returns those pieces of information to the client 101.

On the other hand, when the violating client detection unit 343 determines that a content with a content size of the threshold or more is present (YES in step S411), the process proceeds to step S413.

In step S413, the content storage information issue unit 341 returns an error response to the client 101. At this time, the error response includes the information indicating that the content is determined by the threshold checking to violate a condition.

In step S414, the content storage information acquisition unit 304 in the client 101 checks the returned response, and determines whether the response includes the information indicating that an access token verification has failed. When the content storage information acquisition unit 304 determines that the response includes the information indicating that the access token verification has failed (YES in step S414), the process returns to step S401, where an access token is acquired again.

On the other hand, when the content storage information acquisition unit 304 determines that the response does not include the information indicating that the access token verification has failed (NO in step S414), the process proceeds to step S415.

In step S415, the content storage information acquisition unit 304 determines whether the response includes the information indicating that the content is determined by the threshold checking to violate a condition.

When the content storage information acquisition unit 304 determines that the response includes the information indicating that the content is determined by the threshold checking to violate a condition (YES in step S415), the process of the flowchart is terminated. At this time, the fact may be notified to the user.

On the other hand, when the content storage information acquisition unit 304 determines that the response does not include the information that indicating the content is determined by the threshold checking to violate a condition (NO in step S415), the process proceeds to step S416.

In step S416, the storage operation unit 305 uploads the contents to the storage system 105 by use of the content pass and the authentication information issued by the content storage information issue unit 341 in the upload management system 104, which are included in the response.

In step S417, the content reception unit 361 in the storage system 105 receives the uploaded contents from the storage operation unit 305.

In step S418, the content reception unit 361 stores the contents received in step S417 in the content storage unit 363, and also stores the metadata such as size of the contents in the content metadata management unit 362. The content reception unit 361 then returns the storage result to the storage operation unit 305 in the client 101.

In step S419, the storage operation unit 305 in the client 101 receives a response from the content reception unit 361 in the storage system 105. The process of the flowchart is then terminated. At this time, the user may be notified of the fact that the contents are successfully uploaded.

The access token acquisition process in step S401 in FIG. 4 will be described below with reference to FIG. 5. FIG. 5 is a flowchart illustrating the access token acquisition process by way of example.

In step S501, the authentication process unit 303 issues a client information registration request to the authentication system 103 by use of the user ID and the password previously held in the external memory 210 in the client 101. At this time, the client information includes a client name capable of uniquely identifying the client 101.

In step S502, the client registration reception unit 321 in the authentication system 103 receives the client registration request.

In step S503, the client registration reception unit 321 determines whether the user ID and the password transmitted from the authentication process unit 303 in the client 101 are correct. When they are correct as a result of the determination, the client registration reception unit 321 issues the client information, the client ID, and the client password, and registers them in the client management table 324. Additionally, the client registration reception unit 321 returns the client ID and the client password to the authentication process unit 303 in the client 101.

In step S504, the authentication process unit 303 in the client 101 designates the client ID and the client password returned from the authentication system 103, and issues an access token acquisition request to the authentication system 103.

In step S505, the access token issue unit 322 in the authentication system 103 receives the access token acquisition request.

In step S506, the access token issue unit 322 determines whether the client ID and the client password received in the access token acquisition request are present in the client management table 324.

When it is determined that the client ID and the client password are not present in the client management table 324 (NO in step S506), the process proceeds to step S507.

In step S507, the access token issue unit 322 returns an error response embedding the information indicating that a combination of the client ID and the client password is not present to the authentication process unit 303 in the client 101.

On the other hand, when it is determined that the client ID and the client password are present in the client management table 324 (YES in step S506), the process proceeds to step S508. In step S508, the access token issue unit 322 issues an access token, and stores it in the access token management table 325 in association with the client name. The access token issue unit 322 then returns the issued access token to the authentication process unit 303 in the client 101.

In step S509, the authentication process unit 303 in the client 101 checks the response from the authentication system 103, and determines whether the received response is an error response indicating that the client ID and the client password are not present.

When it is determined that the response is an error response (YES in step S509), the process proceeds to step S501. A client password is basically present, but a client password can be deleted due to any cause and thus the determination is required.

On the other hand, when it is determined that the response is not an error response (NO in step S509), the authentication process unit 303 terminates the process of the flowchart.

The access token verification process in step S404 in FIG. 4 will be described finally with reference to FIG. 6.

FIG. 6 is a flowchart illustrating the access token verification process by way of example.

In step S601, the client information acquisition unit 342 in the upload management system 104 issues an access token verification request to the authentication system 103.

In step S602, the access token verification unit 323 in the authentication system 103 receives the access token verification request.

In step S603, the access token verification unit 323 determines whether the access token received in step S602 is present in the access token management table 325. When it is determined that the access token is present (YES in step S603), the process proceeds to step S604.

In step S604, the access token verification unit 323 compares the expiration of the access token received in step S602 with that in the access token management table 325, and determines whether a current time is before the expiration. When it is determined that the access token is beyond the expiration (expires) (YES in step S604), the process proceeds to step S605. In step S603, also when it is determined that the access token is not present (NO in step S603), the process proceeds to step S605.

In step S605, the access token verification unit 323 returns an error response to the upload management system.

On the other hand, when it is determined that the access token is not beyond the expiration (does not expire) (NO in step S604), the process proceeds to step S606.

In step S606, the access token verification unit 323 returns the client name acquired from the client management table 324 by use of the client ID acquired from the access token management table 325 to the client information acquisition unit 342 in the upload management system 104.

In step S607, the client information acquisition unit 342 in the upload management system 104 receives the response returned from the authentication system 103.

The upload management system according to the first exemplary embodiment as described above is realized so that upload suppression is enabled depending on the size or number of contents without adding the size monitoring function to the storage system or deteriorating the performance due to increased load in the upload management system 104.

The second exemplary embodiment of the present invention will be described. The structure of the second exemplary embodiment will be described below only for the differences from the first exemplary embodiment.

In the system according to the first exemplary embodiment, an error response is only returned to the client 101, and thus the system manager cannot know the occurrence of a security risk.

In the second exemplary embodiment, when the violating client detection unit 343 detects that a content exceeds the thresholds, the fact is notified to the system manager. A detailed description will be made below.

The alert notification unit 344 is added to the upload management system 104 to realize the second exemplary embodiment.

When the violating client detection unit 343 detects that a content exceeds the size threshold or the number threshold, the alert notification unit 344 performs a notification process such as e-mail to the previously-registered system manager. Herein, the process performed by the alert notification unit 344 does not need to be a notification via e-mail transmission, and may be a notification to the management system, for example.

The process flow of the upload management system 104 including the processes of the alert notification unit 344 will be described below with reference to FIG. 7.

Figure 7:
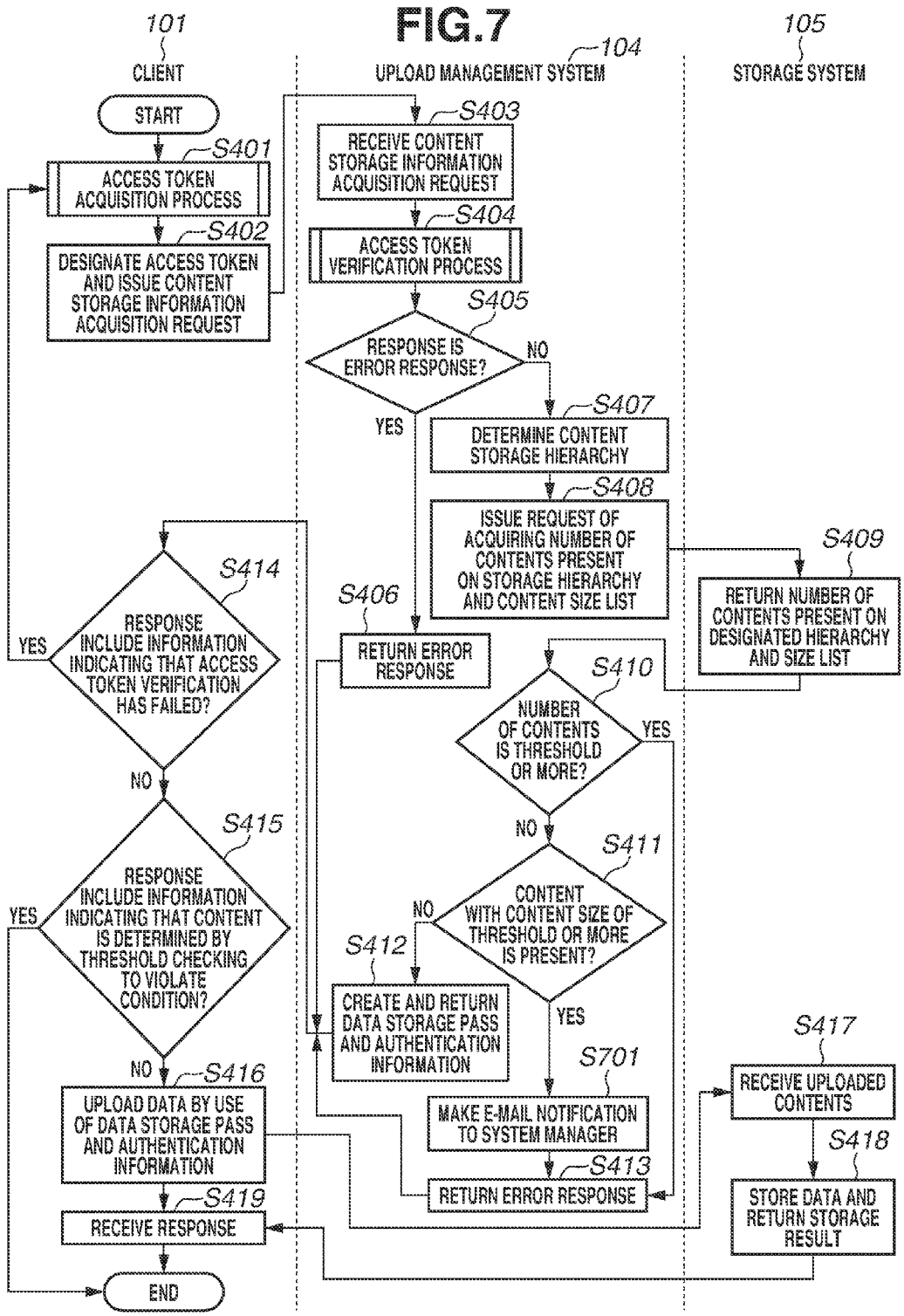
FIG. 7 is a flowchart illustrating a content upload process according to a second exemplary embodiment.

FIG. 7 is a flowchart illustrating a series of processes when a content is uploaded from the client 101 according to the second exemplary embodiment by way of example. The processes in FIG. 7 are the processes in FIG. 4 added with step S701, and the same steps as in FIG. 4 are denoted with the same step numbers. Only step S701 will be described below and the description of other steps will be omitted.

In step S411, when the alert notification unit 344 in the upload management system 104 according to the second exemplary embodiment determines that a content with a content size of the threshold or more is present (YES in step S411), the process proceeds to step S701.

In step S701, the alert notification unit 344 makes an e-mail notification to an e-mail address previously registered as a notification destination of the system manager. The notification includes information indicating that there has occurred a security abnormal situation that a content to be uploaded from the client 101 to the storage system 105 exceeds the size threshold or the number threshold.

Then, after the notification in step S701, the process proceeds to step S413.

As described above, the system according to the second exemplary embodiment is realized so that the system manager can be notified of the fact that there has occurred a security abnormal situation that a content uploaded to the upload system exceeds the size threshold or the number threshold. Therefore, the system manager can easily recognize that there has occurred a security abnormal situation that a content uploaded to the upload system exceeds the size threshold or the number threshold.

The third exemplary embodiment of the present invention will be described. The structure of the third exemplary embodiment will be described below only for the differences from the first and second exemplary embodiments.

In the system according to the second exemplary embodiment, once a content exceeds the threshold in the threshold checking for a client, each time the client makes an access, the system manager is notified of the fact. Therefore, a higher load can be imposed on the operator or the management system.

In the third exemplary embodiment, a client, for which notification to the system manager has been made at least once, subsequent notification to the system manager is prevented from being made. A detailed description will be made below.

The violating client management unit 345 is added to the upload management system 104 to realize the third exemplary embodiment.

When the violating client detection unit 343 detects a client for which a content exceeds the size threshold or the number threshold, the violating client detection unit 343 asks the violating client management unit 345 about whether the system manager has been notified of the client. The violating client management unit 345 searches whether a file whose file name includes the client name of the client (information corresponding to the already-notified client) is present in the server. When the file is not present, the violating client management unit 345 responds, to the violating client detection unit 343, that a notification is to be made to the system manager. On the other hand, when the file is present, the violating client management unit 345 responds that a notification is not to be made to the system manager and only an error response is to be returned to the client 101.

According to the third exemplary embodiment, a file system is selected as an output destination of the client name by use of the client name as information corresponding to the client already notified to the system manager. However, there may be configured such that a database system is selected as an output destination of the client name and the presence of a notification is switched depending on whether information with the client name as a key is stored in the database system. Further, the information corresponding to a client already notified to the system manager is not limited to a client name, and any other information capable of identifying a client may be employed.

The process flow of the upload management system 104 including the processes of the violating client management unit 345 will be described below with reference to FIGS. 8 (8A and 8B).

Figure 8:
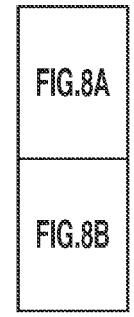
FIGS. 8 (8A and 8B) is a flowchart illustrating a content upload process according to a third exemplary embodiment.
Figure 8A:
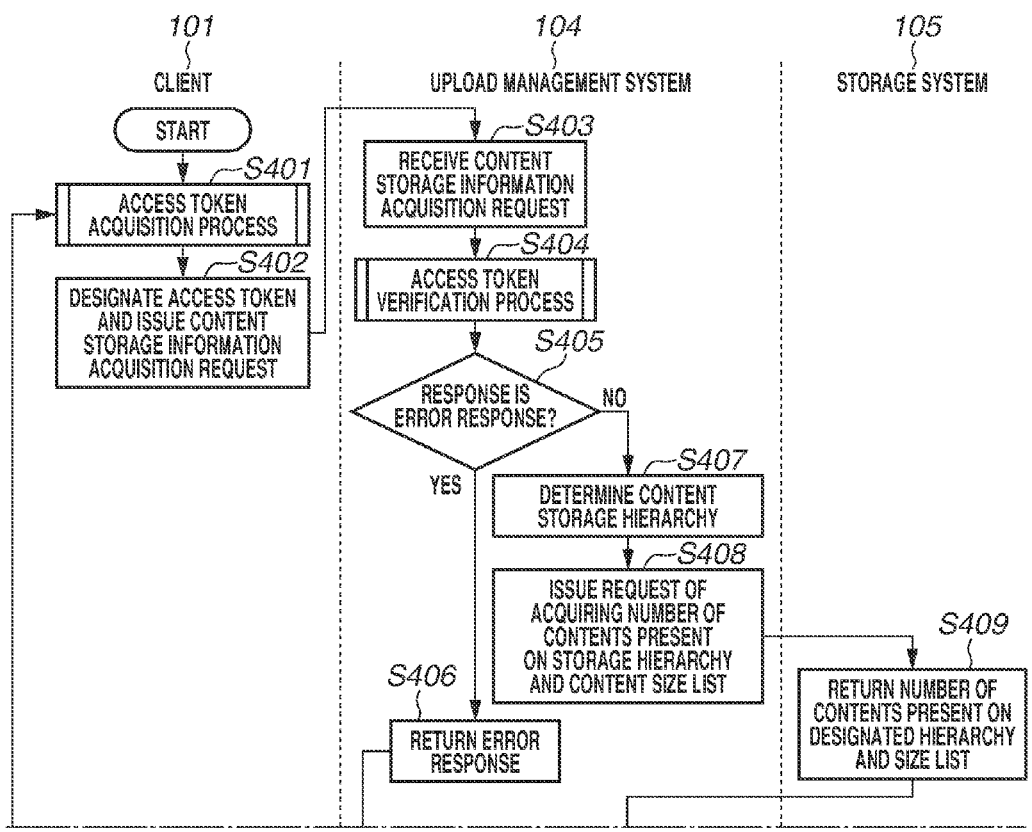

FIGS. 8 (8A and 8B) is a flowchart illustrating a series of processes when a content is uploaded from the client 101 according to the third exemplary embodiment by way of example. The processes in FIGS. 8 (8A and 8B) are the processes in FIG. 7 added with steps S801 and S802, and the same steps as in FIG. 7 are denoted with the same step numbers. Only steps S801 and S802 will be described below, and the description of other steps will be omitted.

In step S411, when the alert notification unit 344 in the upload management system 104 according to the third exemplary embodiment determines that a content with a content size of the threshold or more is present (YES in step S411), the process proceeds to step S801.

In step S801, the violating client management unit 345 determines whether a file whose file name includes the client name of the client transmitting the content storage information acquisition request received in step S403 (information with the client name as a key) is present in the external memory 210 in the information processing apparatus configuring the upload management system 104. When it is determined that the file whose file name includes the client name is not present (NO in step S801), the process proceeds to step S802.

In step S802, the violating client management unit 345 creates a file with the client name as its file name, and the process proceeds to step S701.

On the other hand, when it is determined that the file whose file name includes the client name is present (YES in step S801), the process proceeds to step S413.

As described above, the system according to the third exemplary embodiment is realized so that the second and subsequent notifications do not need to be made for the client which has once made a notification to the system manager, and thus loads on the system manager can be reduced.

A fourth exemplary embodiment of the present invention will be described. The structure of the fourth exemplary embodiment will be described below only for the differences from the first to third exemplary embodiments.

The system according to the third exemplary embodiment employs a file system as an output destination of information indicating that a notification is made to the system manager (information with a client name as a key) by way of example. In other words, there has been described the structure in which a file whose file name includes a client name is stored. However, when the same client makes accesses at the same time, simultaneous file writing is performed, which causes complicated processes. Therefore, the file name of a file whose file name includes the client name is assumed as "client name [random character string]." The random character string may employ any value which changes every output of the violating client management unit 345 and is usable as a file name. In this way, even if the same client makes accesses at the same time, the same file is not written, thereby preventing complicated processes.

The fifth exemplary embodiment of the present invention will be described. The structure of the fifth exemplary embodiment will be described below only for the differences from the first exemplary embodiment.

In the systems according to the first to third exemplary embodiments, when the second upload request is not made from the same client after a large amount of data exceeding the threshold is uploaded (or when only one access is made), the system manager cannot know that a large amount of data has been uploaded.

Therefore, according to the fifth exemplary embodiment, the contents uploaded to the storage system 105 are detected and the size of the uploaded contents or the number of uploaded contents is calculated for each client. There is configured such that when a calculated value exceeds the threshold, the fact is notified to the system manager.

The content monitoring unit 346 is added to the upload management system 104 to realize the fifth exemplary embodiment.

The content monitoring unit 346 periodically asks the content metadata management unit 362, and checks the number of files uploaded from all the clients and the file sizes. When a client for which the number of uploaded files or the file size exceeds the threshold is present, as in the third exemplary embodiment, a file whose file name includes the client name is output. The violating client detection unit 343 according to the fifth exemplary embodiment checks both the files output by the violating client management unit 345 and the files output by the content monitoring unit 346 in step S801 in FIGS. 8 (8A and 8B).

The processes of the content monitoring unit 346 will be described below with reference to FIG. 9.

FIG. 9 is a flowchart illustrating the processes of the content monitoring unit 346 by way of example.

In step S901, the content monitoring unit 346 in the upload management system 104 issues a request of acquiring the number of files of all of the clients and a list of file sizes to the content metadata management unit 362 in the storage system 105.

In step S902, when receiving the list acquisition request, the content metadata management unit 362 in the storage system 105 acquires the number of contents uploaded by all of the clients and the list of file sizes for each client and returns them to the upload management system 104. At this time, a content to be acquired is only an item in which the value of the hierarchy 3 (C3) illustrated in table 3 is a process date. However, a process date may change over midnight, and thus there is assumed only an item in which the value of the hierarchy 3 (C3) is a period including a process date and its previous date. This is applicable to acquire the number of contents and the list of content sizes in step S408 in FIG. 5.

In step S903, when receiving the list returned from the storage system 105, the content monitoring unit 346 in the upload management system 104 determines whether the number of contents is the threshold or more for each client by use of the list.

Then, when the content monitoring unit 346 determines that a client for which the number of contents is the threshold or more is present (YES in step S903), the content monitoring unit 346 acquires a list of clients for which contents exceed the threshold of the number of contents, and the process proceeds to step S905.

On the other hand, when the content monitoring unit 346 determines that a client for which the number of contents is the threshold or more is not present (NO in step S903), the process proceeds to step S904.

In step S904, the content monitoring unit 346 determines whether the content size is the content size threshold or more for each client.

When the content monitoring unit 346 determines that a client for which the content size is the content size threshold or more is not present (NO in step S904), the process proceeds to step S908.

On the other hand, when the content monitoring unit 346 determines that a client for which the content size is the content size threshold or more is present (YES in step S904), the content monitoring unit 346 acquires a list of clients for which the content size exceeds the content size threshold, and the process proceeds to step S905.

In step S905, the content monitoring unit 346 determines whether all of the files including the client names in the list acquired in step S903 or step S904 are present (whether all of the information with a client name as a key is present). When the content monitoring unit 346 determines that all of the files including the client names in the list are present (YES in step S905), the process proceeds to step S908.

On the other hand, when the content monitoring unit 346 determines that a file including a client name in the list is not present (NO in step S905), the process proceeds to step S906.

In step S906, the content monitoring unit 346 notifies the client names, which are not output to the files including client names, among the client names acquired in step S903 or step S904 to the system manager.

In step S907, the content monitoring unit 346 outputs a file including a client name to be notified in step S906 (outputs information with a client name as a key), and the process proceeds to step S908.

In step S908, the content monitoring unit 346 stops for a certain period of time, and the process proceeds to step S901. The stop time at this time is assumed to be statically predetermined, but can be changed by the manager.

The system according to the fifth exemplary embodiment is realized so that even a client, which has sent the content storage information acquisition request once, can be notified to the system manager when a content exceeding the threshold is uploaded.

As described above, each exemplary embodiment of the present invention is configured such that a storage pass from the client to the network storage or an authentication information creation request is received before a content is uploaded on the network storage, a storage pass is acquired based on a value for uniquely identifying the client and a request reception date, the number of contents or the size of contents on the acquired storage pass is checked, and the storage pass to the network storage and the authentication information are not issued when the values exceed the previously determined thresholds of the number of contents and the content size.

In this way, the upload management system according to the present exemplary embodiment is configured at so low loads that uploaded files are not relayed and checked, and thus higher loads are not imposed. Therefore, the low-load upload management system capable of monitoring upload contents and suppressing upload thereof can be constructed without changing the storage system or deteriorating the performance due to increased loads.

Therefore, it is possible to prevent a large amount of contents from being uploaded to the storage system when the client is used by a malicious third party. Therefore, for example, it is possible to suppress a risk that expensive usage charge for the network storage is billed. Further, it is possible to suppress an occurrence of a situation in which the storage area allocated to the user is full and data, which the user truly desires to store, cannot be stored. Furthermore, it is possible to suppress a risk such as information leakage also when the user's storage space is set to be open to other users.

The structure and contents of various items of data described above are not limited to the above, and can be of course configured in various structures or contents depending on application or purpose.

The exemplary embodiments have been described above, but the present invention may employ embodiments of system, device, method, program or storage medium. Specifically, the present invention may be applied to a system including a plurality of devices or may be applied to an apparatus made of one device.

Structures in combinations of the above exemplary embodiments are encompassed within the present invention.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-111292, filed Jun. 1, 2015, which is hereby incorporated by reference herein in its entirety.

What is claimed is:

1. An upload management system for managing data upload from a client to a storage system, the upload management system comprising:
   an acquisition unit configured to acquire information about data already uploaded by the client from the storage system in response to a request from the client which performs data upload; and
   a determination unit configured to determine whether the client violates a predetermined condition based on the information acquired by the acquisition unit, wherein, in a case where the determination unit determines that the client does not violate the condition, authentication information for performing data upload is returned to the client and the client uses returned authentication information to perform the upload,
   wherein, in a case where the determination unit determines that the client violates the condition, the authentication information for performing data upload is not returned to the client, and wherein the case where the client violates the condition is a case where a certain amount of data uploaded by the client in a predetermined period of time exceeds a predetermined threshold.

2. The upload management system according to claim 1, wherein the certain amount of data includes at least one of a number of items of data and a data size.

3. The upload management system according to claim 1, wherein the predetermined period of time is a date when the request is made by the client.

4. The upload management system according to claim 1, further comprising a first notification unit configured to notify, in the case where the determination unit determines that the client violates the condition, information about the client determined to violate the condition to a predetermined notification destination.

5. The upload management system according to claim 4, further comprising a storage unit configured to store, in the case where the determination unit determines that the client violates the condition, information corresponding to the client determined to violate the condition in the storage system,
wherein, in a case where the information corresponding to the client determined to violate the condition is stored in the storage system, the first notification unit does not make the notification.

6. The upload management system according to claim 5, wherein the information corresponding to the client is a file whose file name includes an identifier with which the client can be identified.

7. The upload management system according to claim 6, wherein the information corresponding to the client is a file whose file name includes an identifier with which the client can be identified and a value that changes every time the information is stored.

8. The upload management system according to claim 4, further comprising:
a monitoring unit configured to periodically monitor the presence of a client which violates the condition; and
a second notification unit configured to notify, in a case where a client which violates the condition is specified by the monitoring unit, information about the client which violates the condition to a predetermined notification destination.

9. The upload management system according to claim 8, wherein the monitoring unit periodically acquires information of data already uploaded from all of clients to the storage system from the storage system, determines whether each client violates the predetermined condition based on the acquired information, and thereby specifies a client which violates the condition.

10. A method for controlling an upload management system for managing data upload from a client to a storage system, the method comprising:
acquiring information about data already uploaded by the client from the storage system in response to a request from the client which performs data upload; and
determining whether the client violates a predetermined condition based on the acquired information,
wherein, in a case where it is determined that the client does not violate the condition, authentication information for performing data upload is returned to the client and the client uses returned authentication information to perform the upload,
wherein, in a case where it is determined that the client violates the condition, the authentication information for performing data upload is not returned to the client, and
wherein the case where the client violates the condition is a case where a certain amount of data uploaded by the client in a predetermined period of time exceeds a predetermined threshold.

11. The method according to claim 10, wherein the certain amount of data includes at least one of a number of items of data and a data size.

12. The method according to claim 10, wherein the predetermined period of time is a date when the request is made by the client.

13. The method according to claim 10, further comprising notifying, as a first notification and in the case where it is determined that the client violates the condition, information about the client determined to violate the condition to a predetermined notification destination.

14. The method according to claim 13, further comprising storing, in the case where it is determined that the client violates the condition, information corresponding to the client determined to violate the condition in the storage system,
wherein, in a case where the information corresponding to the client determined to violate the condition is stored in the storage system, notifying includes not making the notification.

15. The method according to claim 14, wherein the information corresponding to the client is a file whose file name includes an identifier with which the client can be identified.

16. The method according to claim 15, wherein the information corresponding to the client is a file whose file name includes an identifier with which the client can be identified and a value that changes every time the information is stored.

17. The method according to claim 13, further comprising:
periodically monitoring the presence of a client which violates the condition; and
notifying, as a second notification and in a case where a client which violates the condition is specified, information about the client which violates the condition to a predetermined notification destination.

18. The method according to claim 17, wherein periodically monitoring includes periodically acquiring information of data already uploaded from all of clients to the storage system from the storage system, determines whether each client violates the predetermined condition based on the acquired information, and thereby specifies a client which violates the condition.

19. A non-transitory storage medium storing a program to cause a computer to perform a method for controlling an upload management system for managing data upload from a client to a storage system, the method comprising:
acquiring information about data already uploaded by the client from the storage system in response to a request from the client which performs data upload; and
determining whether the client violates a predetermined condition based on the acquired information,
wherein, in a case where it is determined that the client does not violate the condition, authentication information for performing data upload is returned to the client and the client uses returned authentication information to perform the upload, wherein, in a case where it is determined that the client violates the condition, the authentication information for performing data upload is not returned to the client, and wherein the case where the client violates the condition is a case where a certain amount of data uploaded by the client in a predetermined period of time exceeds a predetermined threshold.

* * * * *